US 8,275,058 B2

(12) United States Patent
Sandell et al.

(10) Patent No.: US 8,275,058 B2
(45) Date of Patent: Sep. 25, 2012

(54) WIRELESS COMMUNICATIONS APPARATUS

(75) Inventors: Magnus Stig Torsten Sandell, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 809 days.

(21) Appl. No.: 12/352,823

(22) Filed: Jan. 13, 2009

(65) Prior Publication Data
US 2009/0202009 A1 Aug. 13, 2009

(30) Foreign Application Priority Data

Jan. 17, 2008 (GB) ................................. 0800872.4

(51) Int. Cl.
*H04K 1/10* (2006.01)
*H04L 27/28* (2006.01)
(52) U.S. Cl. ........ 375/260; 375/267; 375/299; 370/203; 370/208; 455/509
(58) Field of Classification Search .................. 375/260, 375/267, 299; 370/203–211; 455/509
See application file for complete search history.

(56) References Cited

U.S. PATENT DOCUMENTS

| | | | | |
|---|---|---|---|---|
| 2005/0099937 | A1* | 5/2005 | Oh et al. | 370/207 |
| 2006/0034382 | A1* | 2/2006 | Ozluturk et al. | 375/267 |
| 2009/0175363 | A1* | 7/2009 | Hottinen et al. | 375/260 |

* cited by examiner

*Primary Examiner* — Curtis Odom
(74) *Attorney, Agent, or Firm* — Oblon, Spivak, McClelland, Maier & Neustadt, L.L.P.

(57) ABSTRACT

Allocation of subcarriers of a wireless communications channel to antennas for transmission of said subcarriers from a multi-antenna transmitter, comprises selecting, for each subcarrier, the antenna with the most effective transmission performance against a predetermined performance criterion; and determining if subcarriers are evenly distributed amongst said antennas. If even distribution does not arise, then a reallocation sequence is performed. This comprises identifying, for an antenna having excessive subcarriers allocated thereto, the subcarriers allocated thereto and reallocating one of said subcarriers as required, said reallocated subcarrier being selected for reallocation on the basis of its impact on transmission performance.

16 Claims, 5 Drawing Sheets

SUBCARRIERS →

| | 1 | 2 | 3 | 4 | 5 | 6 | 7 | 8 | 9 | |
|---|---|---|---|---|---|---|---|---|---|---|
| | 0.95 | 0.61 | 0.89 | 0.27 | 0.82 | 0.37 | 0.92 | 0.18 | 0.70 | 1 |
| | 0.23 | 0.49 | 0.74 | 0.02 | 0.67 | 0.49 | 0.74 | 0.10 | 0.41 | 2 |
| | 0.47 | 0.27 | 0.55 | 0.42 | 0.44 | 0.82 | 0.63 | 0.11 | 0.56 | 3 |

ANTENNAS

FIGURE 4

| 1 | 2 | 3 | 4 | 5 | 6 | 7 | 8 | 9 | |
|---|---|---|---|---|---|---|---|---|---|
| 0.72 | 0.34 | 0.34 | 0.25 | 0.38 | 0 | 0.29 | 0.08 | 0.29 | 1 |
| 0 | 0.22 | 0.19 | 0 | 0.23 | 0.12 | 0.11 | 0 | 0 | 2 |
| 0.24 | 0 | 0 | 0.40 | 0 | 0.45 | 0 | 0.01 | 0.15 | 3 |

FIGURE 5

| 1 | 2 | 3 | 4 | 5 | 6 | 7 | 8 | 9 | |
|---|---|---|---|---|---|---|---|---|---|
| 0.72 | 0.34 | 0.34 | 0.25 | 0.38 | 0 | 0.29 | 0.08 | 0.29 | 1 |
| 0 | 0.22 | 0.19 | 0 | 0.23 | 0.12 | 0.11 | 0 | 0 | 2 |
| 0.24 | 0 | 0 | 0.40 | 0 | 0.45 | 0 | 0.01 | 0.15 | 3 |

FIGURE 6

| 1 | 2 | 3 | 4 | 5 | 6 | 7 | 8 | 9 | |
|---|---|---|---|---|---|---|---|---|---|
| 0.72 | 0.34 | 0.34 | 0.25 | 0.38 | 0 | 0.29 | 0.08 | 0.29 | 1 |
| 0 | 0.22 | 0.19 | 0 | 0.23 | 0.12 | 0.11 | 0 | 0 | 2 |
| 0.24 | 0 | 0 | 0.40 | 0 | 0.45 | 0 | 0.01 | 0.15 | 3 |

FIGURE 7

WIRELESS COMMUNICATIONS APPARATUS

This invention relates to wireless communications and is particularly, but not exclusively, concerned with the provision of per-subcarrier precoding in OFDM systems. In particular, aspects of the invention relate to precoding for wireless transmission systems with multiple antennas.

It is well known that the use of multiple-element antenna arrays can improve the performance of wireless communication systems. This has lead to widespread use of multiple-input single-output (MISO) and multiple-input multiple-output (MIMO) wireless systems, where 'input' refers to transmission antennas and 'output' refers to reception antennas.

Precoding is a powerful technique intended to improve link quality and/or system capacity in wireless systems. By using channel knowledge at the transmitter, the transmitted signal can be pre-processed to match the wireless channel and, for example, to reduce error rates. In MISO systems (multiple transmit antennas and a single receive antenna), the single data stream can be beamformed using, for example, maximal-ratio transmission to improve link quality. However, if there are constraints on effective isotropic radiated power (EIRP), which limit the transmitted power in all directions, the transmitted power may have to be suppressed ('backed off') in order not to exceed the limit in the direction of maximum power. WiMedia is an example of a specified technology in which EIRP constraints are imposed.

On the other hand, if the available hardware is employed in the manner of 'antenna selection', that is, transmitting from only one antenna at a time, the transmitted power will be the same in all directions. In such a case, no back-off would be required.

In an OFDM system, the antenna selection can be applied on a per-subcarrier basis. Such an approach is compatible with the need to meet EIRP constraints, in systems such as WiMedia, in which there is a maximally allowed transmitted power in all directions at all frequencies.

Antenna selection can, as an alternative approach, be performed over the whole available band. In such an arrangement, all subcarriers are transmitted on only one antenna. However, this approach has the drawback that it does not permit selection of antennas on a per-subcarrier basis. This means that the arrangement could have suboptimal performance, if the selected antenna is not appropriate for a particular one or group of subcarriers. Switching losses may also arise when switching between antennas, as the per-subcarrier selection is done digitally and, at the point of switching, both antennas transmit simultaneously (if two antennas are provided).

A particular problem presented by per-subcarrier antenna selection is that one antenna may be allocated more subcarriers than others in the transmission apparatus. This antenna would thus be required to transmit more power. This imbalance of power between transmit antennas can cause substantial technical problems with power amplifiers (PAs), and power back-off may be needed: this can degrade system performance. This problem was addressed in "An adaptive antenna selection scheme for transmit diversity in OFDM systems" (H. Shi, M. Katayama, T. Yamazato, H. Okada, A. Ogawa,, VTC Fall 2001, vol 4, pp 2168-2172, October 2001), in which an ad hoc method for allocating the same number of subcarriers to all antennas was described.

Although Shi et al. describes an algorithm which allocates the same number of subcarriers to all antennas, the approach taken is not optimal.

An aspect of the invention provides a reduced complexity per-subcarrier antenna-selection precoding in OFDM systems such that the transmitted power is substantially the same for all antennas.

An aspect of the invention provides a reduced complexity method for per-subcarrier antenna selection in OFDM systems which delivers substantially the same transmit power for all antennas.

Aspects of the invention can also be combined with subcarrier grouping to reduce complexity further.

An aspect of the invention provides a method of allocating subcarriers of a wireless communications channel to antennas for transmission of said subcarriers from a multi-antenna transmitter, the method comprising allocating subcarriers to antennas by selecting, for each subcarrier, the antenna with the most effective transmission performance against a predetermined performance criterion, and determining if subcarriers are evenly distributed amongst said antennas and, if not, performing a reallocation sequence comprising identifying, for an antenna having excessive subcarriers allocated thereto, the subcarriers allocated thereto and reallocating one of said subcarriers as required, said reallocated subcarrier being selected for reallocation on the basis of its impact on transmission performance.

An aspect of the invention provides a communications apparatus operable to establish a wireless transmission on a channel defined with a plurality of subcarriers, the communications apparatus comprising a plurality of antennas for emission of transmit signals therefrom, the apparatus further comprising subcarrier allocation means operable to allocate subcarriers to antennas for transmission, the subcarrier allocation means being operable to determine an optimal allocation based on one or more performance characteristics of the apparatus and/or the channel, being further operable to reallocate one or more subcarriers away from an antenna with excessive subcarriers allocated thereto, a subcarrier being selected for reallocation on the basis of impact of said reallocation on said one or more performance characteristics.

It will be appreciated that aspects of the invention can be provided in the form of a computer program product, which can be introduced in the form of a storage medium, such as an optical disk, a mass storage device (such as FLASH memory) or as a signal receivable by a computer. The computer program product may comprise processor executable code providing all of the function of the present invention, or it may provide control code operable to cause existing functional blocks of a computer to operate in accordance with the invention.

Specific embodiments of the invention will now be described with reference to the accompanying drawings, in which:

FIG. 4 illustrates an allocation of subcarriers to antennas in accordance with a first stage of an example of use of the specific embodiment of the invention;

FIG. 5 illustrates relative performance costs of reallocations of subcarriers to antennas on the basis of the allocation set out in FIG. 4;

FIG. 6 illustrates a diagram similar to FIG. 5 but after a first reallocation step;

FIG. 7 illustrates a diagram similar to FIG. 5 but after a second reallocation step.

The described specific embodiment of the invention addresses and mitigates the problem of power imbalance between the antennas by constraining operation of subcarrier precoding, by requiring that the same number of subcarriers is selected from each antenna. This means that the same power will be transmitted on all antennas.

Figure 1:
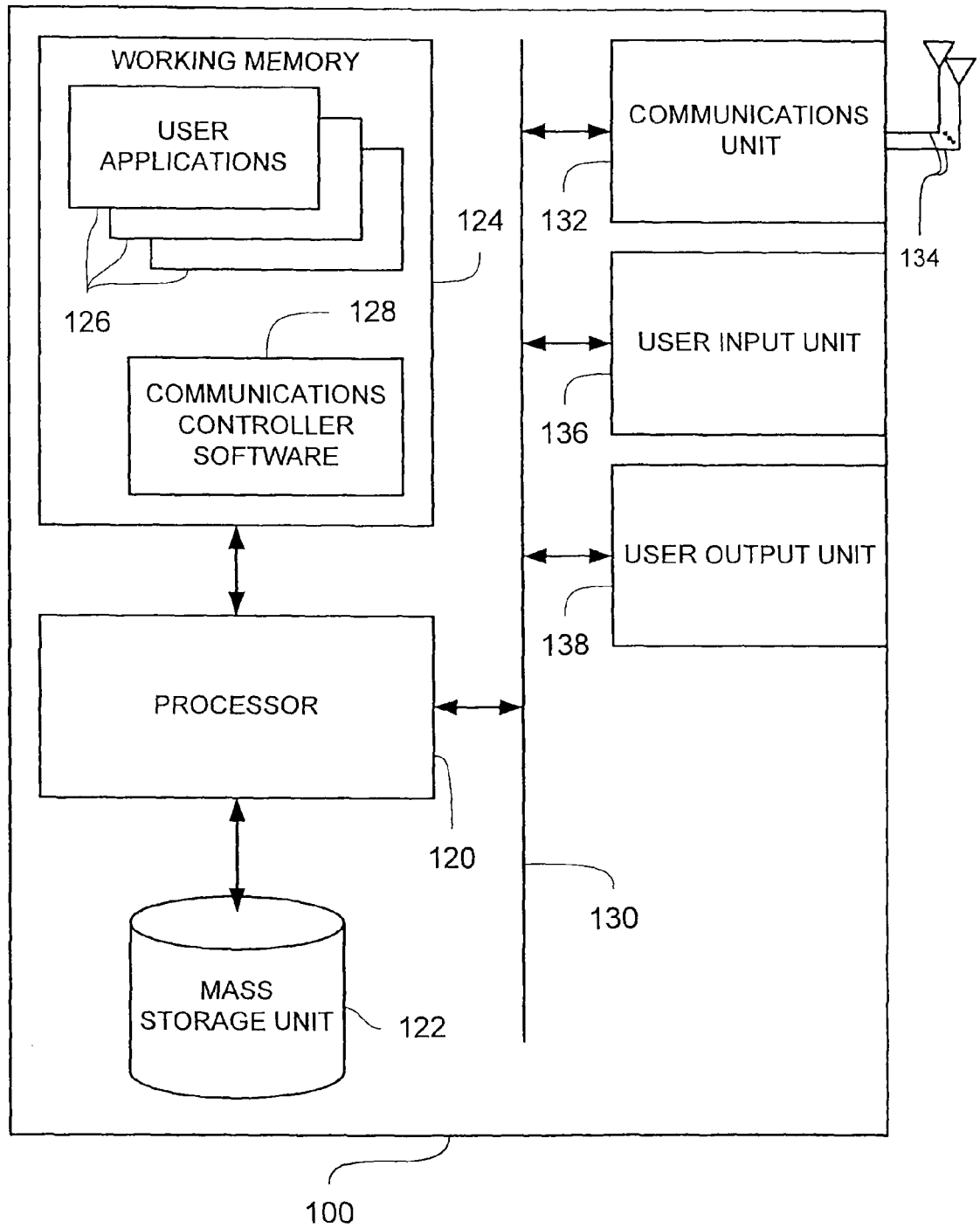
FIG. 1 illustrates a communications apparatus in accordance with a specific embodiment of the invention.

Referring now to FIG. 1, in an embodiment of the present invention, a wireless communications apparatus 100 is illustrated in schematic form. The apparatus could take the form of a portable computer, or any other device operable to use a wideband communications channel appropriate for implementation of the invention.

The apparatus 100 comprises a processor 120 operable to execute machine code instructions stored in a working memory 124 and/or retrievable from a mass storage device 122. By means of a general-purpose bus 130, user operable input devices 136 are in communication with the processor 120. The user operable input devices 136 comprise any means by which an input action can be interpreted and converted into data signals, such as a keyboard, a mouse, a tablet, a touch screen or even voice activated command devices.

Audio/video output devices 138 are further connected to the general-purpose bus 130, for the output of information to a user. Audio/video output devices 138 include any device capable of presenting information to a user, for example, a video screen, a loudspeaker, etc.

A communications unit 132 is connected to the general-purpose bus 308, and further connected to an antenna or set of antennas 134. By means of the communications unit 132 and said antenna 134, the apparatus 100 is capable of establishing wireless communication with other compatible apparatus. The communications unit 132 is operable to convert data passed thereto on the bus 130 to an RF signal carrier in accordance with a communications protocol previously established for use by a system in which the apparatus 100 is appropriate for use, for example UWB.

In the apparatus 100 of FIG. 1, the working memory 124 stores applications including a communications controller 128 which, when executed by the processor 120, cause the establishment of an interface to enable communication of data to and from other nodes. The communications controller 128 thus establishes general purpose or specific computer implemented utilities and facilities that are used in linking nodes.

User applications 126 are also illustrated, offering (by execution by the processor 120) services to a user as required.

Figure 2:
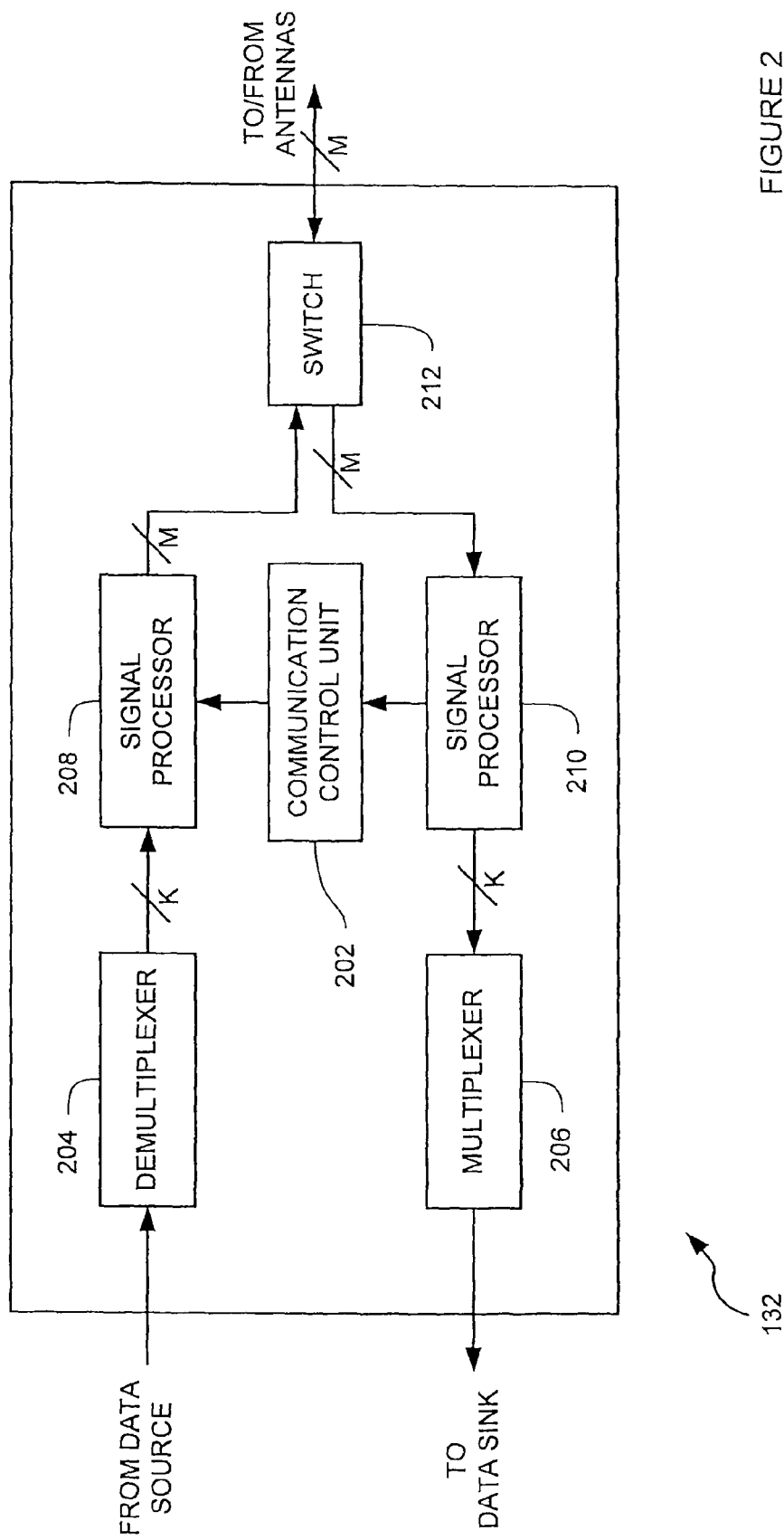
FIG. 2 illustrates a communication unit of the apparatus illustrated in FIG. 1.

The communications unit 132 is illustrated in further detail in FIG. 2. The communications unit 132 comprises a communications control unit 202. This controls operation of the communications unit 132, both in terms of operation in accordance with the specific embodiment but also in terms of other functionality, in accordance with prior art examples, which are not the subject of the present invention.

The communications unit 132 is operable to receive data to be transmitted in any suitable form, such as a serial data stream, from a data source. The nature of this data source need not be specified for an understanding of the invention but, in the context of the apparatus 100, this is likely to arrive from the processor 120 via the bus 130.

A demultiplexer 204 operates to convert the data stream into a plurality of subcarrier streams, corresponding to the number of subcarriers K defined in the communications technology with which the communications unit 132 is operable. In the examples set out below, N=64, but this is not a constraint on particular implementation of the invention.

A signal processor 208 processes the K subcarrier streams into M antenna signals, for transmission. Allocation of the K subcarrier streams to the M antenna signals is the subject of this specific embodiment.

A switch 212 operates to duplex transmit and receive activity on the same set of antennas 134. The switch is under the control of the communications control unit 202, and is operable to permit transmission in accordance with a medium access protocol. The exact nature of this medium access protocol is not a subject of this disclosure, and the reader will be able to choose a suitable protocol for the particular implementation of the present invention, as the case may be.

In return, a signal processor 210 on a receive path of the communications unit 132 operates to receive M antenna signals from the antennas 134, and to detect K subcarrier streams on these signals. These K subcarrier streams are put to a multiplexer 206 which assembles a data stream, for output to a data sink as appropriate.

The signal processor 210 of the receive path is also operable to pass channel information to the communications controller unit which may or may not influence the allocation of the K subcarriers to the M antenna signals.

In use, the communications control unit 202 is operable to pass to the signal processor 208 of the transmit path a subcarrier allocation control command controlling the manner in which subcarriers are to be allocated to the antennas.

As noted above, the intention is to allocate subcarriers to antennas in a manner which, as far as possible, does not deviate significantly from the optimal allocation, but which provides for substantially uniform transmit power at each available antenna.

Given the constraint so imposed on the communications control unit 202, a performance metric can be optimised. Mathematically the cost function to be minimised by the communications control unit 202 is:

$$f(x) = \sum_{k=1}^{K} \sum_{m=1}^{M} x_{k,m} C_{k,m}$$

where $x_{k,m} \in \{0,1\}$ is the selection variable. That is, $x_{k,m}=1$ if data is transmitted on subcarrier k and antenna m, and $x_{k,m}=0$ if not. The cost $C_{k,m}$ is associated with subcarrier k and antenna m and, in this embodiment, defined as the capacity or bit-error rate. Since costs are normally minimised, two suitable definitions of the cost can be put forward, adopting BPSK modulation.

If capacity is considered the best representation of cost, then the cost is defined as:

$$C_{k,m} = -\log_2(1 + SNR_{k,m})$$

Alternatively, if BER is the most appropriate representation of cost, then:

$$C_{k,m} = Q(\sqrt{2SNR_{k,m}})$$

In the above statements, $SNR_{k,m}$ is the SNR per subcarrier and antenna. This is the BER for BPSK modulation and, if another constellation, such as a general QAM case, is used, then the appropriate BER formulation will be used. Of course, it will be appreciated also that other costs could be formulated for use in the optimisation.

The constraint of transmitting on only one antenna per subcarrier can then be expressed as:

$$\sum_{m=1}^{M} x_{k,m} = 1, \forall k$$

and the constraint that all antennas should have similar numbers of subcarriers allocated to them is expressed as:

$$\sum_{k=1}^{K} x_{k,m} \leq \left\lceil \frac{K}{M} \right\rceil, \forall m,$$

where $\lceil y \rceil$ is a 'ceiling' function, denoting the smallest integer that is at least as large as y. If K is divisible by M, an equality can be used instead of the inequality.

The method employed by the apparatus so described in allocating subcarriers to antennas will now be described with reference to FIG. 3.

The method starts from the unconstrained solution. That is, for each subcarrier, the antenna with the smallest cost associated with it is chosen for transmission of that subcarrier without considering any power imbalance. In order to guarantee that the same power is allocated to all antennas, which is achieved by allocating the same number of subcarriers to each antenna, antenna selections are reallocated until balance between the antennas is arrived at.

The method, and the example given below for explanation thereof, assumes that the apparatus has M transmit antennas and K subcarriers, as set out above. The intention is to allocate the subcarriers as evenly as possible, with accumulation of as little cost as possible. For the benefit of the reader, even distribution is considered to arise when each antenna has $\leq \lceil K/M \rceil$ subcarriers allocated to it which, if K is not divisible by M, will mean that one or more of the antennas will have one extra subcarrier allocated to it than the remainder of antennas.

Figure 3:
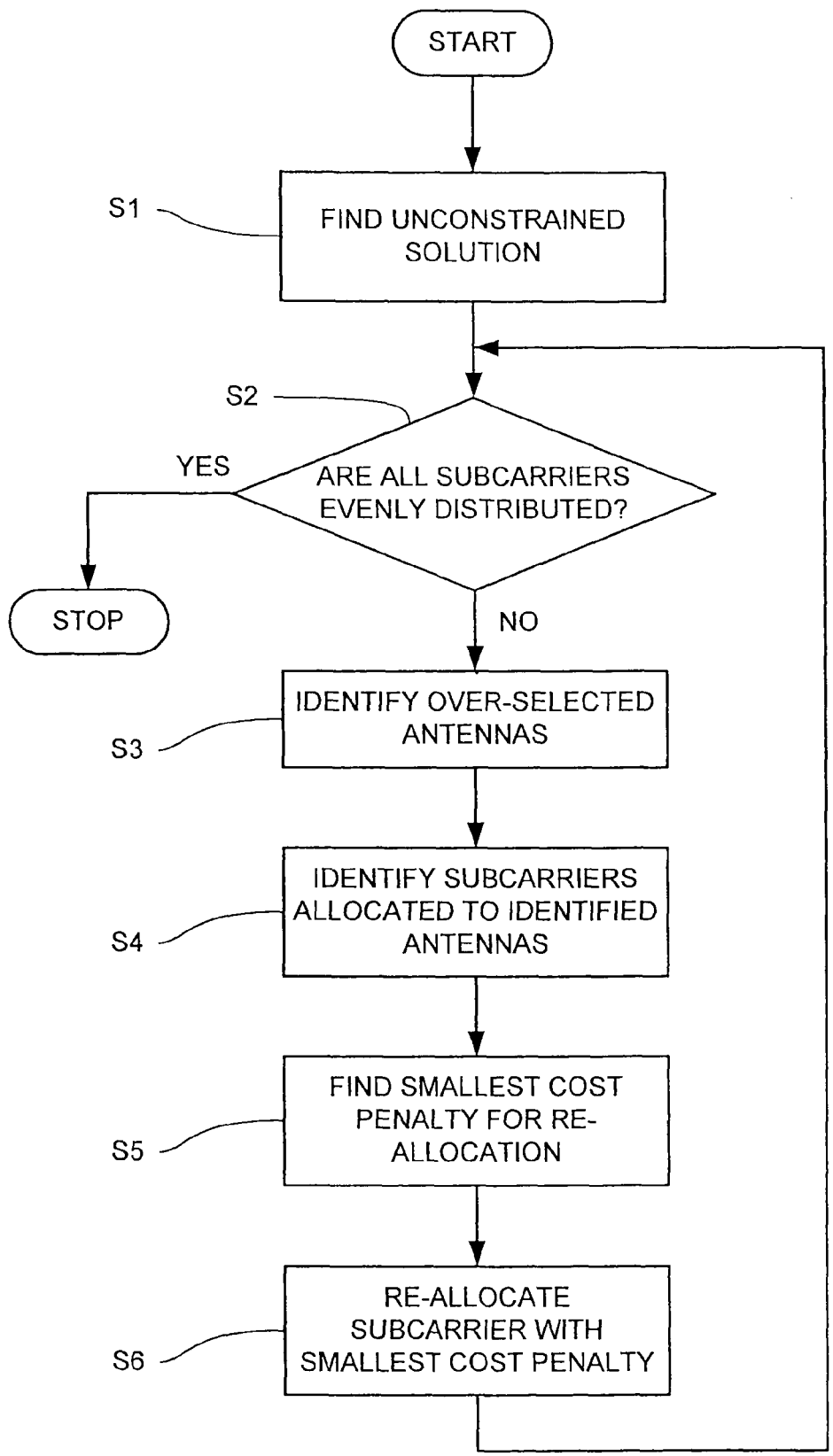
FIG. 3 illustrates a method performed, in use, by a communication control unit of the communication unit illustrated in FIG. 2.
Figure 8:
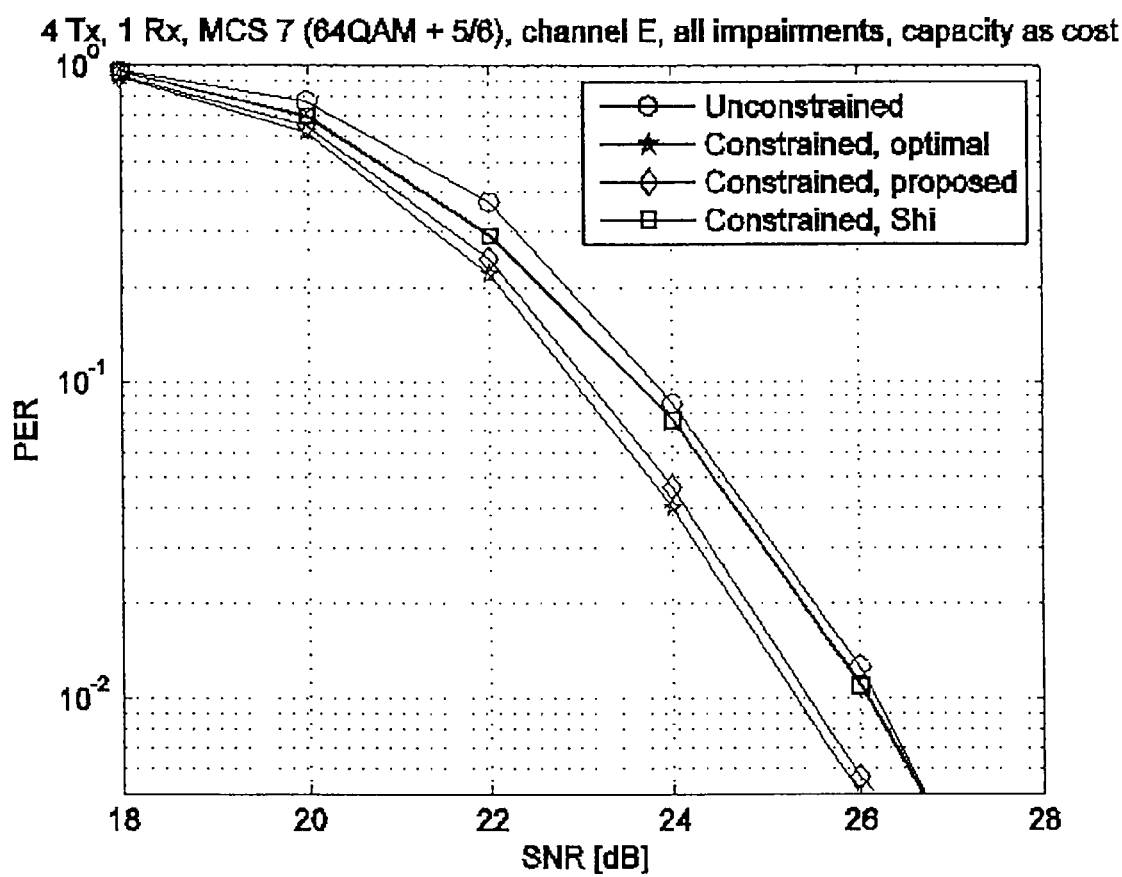
FIG. 8 illustrates graphically data from experimental trials of specific embodiments of the invention, as compared with other apparata.

The method as illustrated in FIG. 3 will be understood from the following steps.

The method commences in step 1, by start with the unconstrained solution in which, on each subcarrier, the antenna which has the smallest cost is chosen.

Then, in step 2, a determination is made as to whether this solution has an even distribution of subcarriers per antenna. If so, then the method terminates. Otherwise, in step 3, all antennas that have more than $\lceil K/M \rceil$ subcarriers allocated to them are identified for consideration. These are the antennas which require reallocation of one or more subcarriers away from them. In step 4, for each so identified antenna, the subcarriers currently identified for that antenna.

In step 5, each of these subcarriers are checked and the one whose reallocation would have the smallest impact on cost is selected. Specific allocations to particular antennas (those with too few subcarriers currently allocated thereto) are considered at this stage. Hence, the cost degradation of each postulated reallocation (in terms of the subcarrier to be reallocated, combined with the antenna to which reallocation is being postulated) is the governing criterion in this step. It will be appreciated that only reallocations to antennas with too few subcarriers are considered.

In step 6, the allocation of the subcarrier so identified is changed, to the antenna with the second smallest cost when compared with the optimal allocation. Then, the process returns to step 2 until all antennas have the required number of subcarriers allocated to them.

An example of the method described above will now be described with reference to FIGS. 4 to 7, for apparatus wherein M=3 and K=9. After computing the costs, the unconstrained solution is obtained by choosing the smallest cost per subcarrier, indicated by shading in FIG. 4.

The cost penalties associated with the unconstrained solution illustrated in FIG. 4, namely the difference between the costs and the minimum cost on a per-subcarrier basis, are shown in FIG. 5. In this example, $\lceil K/M \rceil$=3. Antennas 2 and 3 each have 4 subcarriers allocated thereto, and so have more than the maximum for achievement of an even allocation.

From the subcarriers allocated to these antennas, the smallest cost penalty (0.08) is incurred when allocating antenna 1 on subcarrier 8, as shown in FIG. 6. It should be noted that a smaller cost penalty can be had by allocating antenna 3 on subcarrier 8 (0.01) but that is an invalid re-allocation since antenna 3 already has too many subcarriers allocated to it.

Antenna 3 still, after this reallocation, has too many allocated to it (four, namely subcarriers 2, 3, 5, and 7). On these subcarriers, the smallest cost penalty is 0.29 when allocating antenna 1 on subcarrier 7. Again there are moves that incur a smaller cost penalty, e.g., 0.11 when allocating antenna 3 on subcarrier 4, but they are all invalid as they are to an antenna with too many subcarriers. Reallocation of subcarrier 7 to antenna 1 is shown in FIG. 7.

To illustrate the performance of the invention, experimental simulations were carried out using an M=4 antenna OFDM system with K=64 subcarriers. Four antenna-selection precoding schemes were compared:
  (i) per-subcarrier antenna selection with no constraints on the per-antenna power ("unconstrained");
  (ii) optimal per-subcarrier antenna selection with constraints on the per-antenna power ("constrained, optimal");
  (iii) the presently described embodiment ("constrained, as proposed);
  (iv) a prior art example as set out in Shi et al. ("constrained, Shi").

In FIG. 5, the performance of these four different antenna selection schemes can be compared. The simulations were carried out for an IEEE 802.11n-based OFDM system with all the impairments specified in "IEEE 802.11 TGn Comparison Criteria" (Adrian Stephens et al, IEEE 802.11-03/814r30, May 2004). The cost function used in the simulation was the channel capacity. Without any power constraints, degradations caused by performance of the power amplifiers make the "unconstrained" antenna selection scheme the worst. The best scheme as illustrated in FIG. 3 is, as would be expected, the "constrained, optimal" scheme, which avoids these problems. The reduced-complexity method "constrained, proposed" of the illustrated embodiment of the present invention outperforms the previously published method "constrained, Shi" and has almost identical performance to "constrained, optimal". Thus, according to the experimental data, the performance of the specific embodiment of the invention described herein is effective and comparable to the optimal constrained approach, while offering benefits in terms of opportunities to limit computational complexity.

Whereas the described embodiment illustrates how the manner of allocation of subcarriers can be carried out by general purpose communications hardware under the control of software, more application specific hardware could be provided instead, including the use of an ASIC, a DSP under the control of suitable instructions, or an FPGA. Also, the communications controller so described could be provided either in whole or in part by way of computer executable instructions, which could be introduced as a computer program product such as a computer readable medium, such as a storage device, for example an optical disk, or such as a mass storage medium such as a FLASH memory device. The computer program product could also be introduced over a communications channel, such as by way of the established wireless communications channel of a device, and such as a patch or update to existing software.

While the foregoing disclosed embodiments of the invention are in terms of subcarriers defined in frequency in a wideband channel, the reader will understand that the invention can be embodied in other ways for use in communications channels with subcarriers defined in some other way.

No part of the foregoing should be read as a specific limitation on the scope of protection sought. The invention for which protection is sought can be construed from the claims appended hereto.

The invention claimed is:

1. A method of allocating subcarriers of a wireless signal to antennas for transmission of said subcarriers from a multi-antenna transmitter, the method comprising:
   allocating subcarriers to antennas by selecting, for each subcarrier, the antenna with the most effective transmission performance against a predetermined performance criterion; and
   determining if subcarriers are evenly distributed amongst said antennas and, if not, performing a reallocation sequence comprising:
      identifying, for an antenna having excessive subcarriers allocated thereto, the subcarriers allocated thereto; and
      reallocating one of said subcarriers as required, said reallocated subcarrier being selected for reallocation on the basis of its impact on transmission performance.

2. A method in accordance with claim 1 and wherein said predetermined performance criterion is channel capacity.

3. A method in accordance with claim 1 and wherein said predetermined performance criterion is bit error rate.

4. A method in accordance with claim 1 wherein said determining as to whether subcarriers are evenly distributed comprises determining if the maximum number of subcarriers allocated to any one antenna is no more than one greater than the minimum number of subcarriers allocated to any one antenna.

5. A method in accordance with claim 1 wherein said reallocating comprises identifying, from all subcarriers allocated to antennas that prevent satisfaction of said evenly distributed criterion, the subcarrier which, if reallocated to another antenna with fewer subcarriers allocated thereto, will cause the least diminution of performance as determined against said predetermined performance criterion.

6. A method in accordance with claim 5 wherein said reallocating comprises identifying, from all subcarriers allocated to antennas that prevent satisfaction of said evenly distributed criterion, the subcarrier which, if reallocated to another antenna with fewer subcarriers allocated thereto than the ratio of the number of subcarriers to the number of antennas, will cause the least diminution of performance as determined against said predetermined performance criterion.

7. A method in accordance with claim 1 wherein said wireless signal is an OFDM signal.

8. A method of generating a wireless communications signal comprising, for data to be transmitted, assigning said data to a plurality of subcarriers defined in a wireless signal, allocating subcarriers to antennas for transmission in accordance with claim 1, and emitting signals from said antennas in accordance with said allocation.

9. A non-transitory computer readable medium comprising instructions executable by a computer, to cause said computer to perform the method of claim 1.

10. A communications apparatus operable to establish a wireless transmission on a signal defined with a plurality of subcarriers, the communications apparatus comprising:
   a plurality of antennas for emission of transmit signals therefrom; and
   subcarrier allocation means operable to allocate subcarriers to antennas for transmission by selecting, for each subcarrier, the antenna with the most effective transmission performance against a predetermined performance criterion;
   the subcarrier allocation means being operable to determine if subcarriers are evenly distributed amongst said antennas and, if not, to identify for an antenna having excessive subcarriers allocated thereto, the subcarriers allocated thereto;
   the subcarrier allocations means being further operable to re-allocate one or more subcarriers away from an antenna with excessive subcarriers allocated thereto, a subcarrier being selected for reallocation on the basis of impact of said reallocation on transmission performance.

11. Apparatus in accordance with claim 10 and wherein said predetermined performance criterion is channel capacity.

12. Apparatus in accordance with claim 10 and wherein said predetermined performance criterion is bit error rate.

13. Apparatus in accordance with claim 10 wherein said subcarrier allocation means is operable to determine that subcarriers are evenly distributed if the maximum number of subcarriers allocated to any one antenna is no more than one greater than the minimum number of subcarriers allocated to any one antenna.

14. Apparatus in accordance with claim 10 wherein said subcarrier allocation means is operable to identify, from all subcarriers allocated to antennas that prevent satisfaction of said evenly distributed criterion, the subcarrier which, if reallocated to another antenna with fewer subcarriers allocated thereto, will cause the least diminution of performance as determined against said predetermined performance criterion.

15. Apparatus in accordance with claim 14 wherein said subcarrier allocation means is operable to identify, from all subcarriers allocated to antennas that prevent satisfaction of said evenly distributed criterion, the subcarrier which, if reallocated to another antenna with fewer subcarriers allocated thereto than the ratio of the number of subcarriers to the number of antennas, will cause the least diminution of performance as determined against said predetermined performance criterion.

16. Apparatus in accordance with claim 10, wherein said apparatus is OFDM communications apparatus.

* * * * *